(12) United States Patent
Linsmeier

(10) Patent No.: US 6,951,253 B1
(45) Date of Patent: Oct. 4, 2005

(54) ANIMAL BEDDING GROOMER

(75) Inventor: Richard Linsmeier, Menominee, MI (US)

(73) Assignee: Superior Attachments, Inc., Menominee, MI (US)

( * ) Notice: Subject to any disclaimer, the term of this patent is extended or adjusted under 35 U.S.C. 154(b) by 0 days.

(21) Appl. No.: 10/801,320

(22) Filed: Mar. 16, 2004

(51) Int. Cl.7 ............................................. A01D 78/10
(52) U.S. Cl. ............................ 172/25; 172/110; 56/367
(58) Field of Search ................................ 172/23, 25, 26, 172/26.5, 107, 108, 110, 111; 15/236.1, 256.5, 15/256.51, 256.52, 236.05; 56/365–367, 56/375–377

(56) References Cited

U.S. PATENT DOCUMENTS

| | | | |
|---|---|---|---|
| 3,922,745 A | 12/1975 | Lehman | |
| 4,163,302 A | 8/1979 | Iaboni | |
| 4,202,160 A * | 5/1980 | van der Lely | 56/366 |
| 4,245,457 A * | 1/1981 | Gerlinger | 56/370 |
| 4,286,427 A * | 9/1981 | van der Lely | 56/377 |
| 4,543,678 A | 10/1985 | Cox | |
| 4,574,735 A | 3/1986 | Hohenstein | |
| 4,621,487 A * | 11/1986 | Urlacher et al. | 56/228 |
| 4,641,491 A * | 2/1987 | van der Lely et al. | 56/228 |
| 4,693,065 A * | 9/1987 | Aron et al. | 56/377 |
| 4,706,607 A | 11/1987 | Ijichi | |
| 5,060,465 A * | 10/1991 | Jerome | 56/367 |
| 5,163,277 A * | 11/1992 | Fransgaard | 56/366 |
| 5,373,652 A | 12/1994 | Olsson | |
| 5,464,066 A | 11/1995 | Doucet | |
| 6,272,826 B1 | 8/2001 | Menichetti | |
| 6,446,298 B1 | 9/2002 | Berg | |

FOREIGN PATENT DOCUMENTS

DE 19705426 8/1998

OTHER PUBLICATIONS

Dowdy's Sales & Service Rotary Conditioner, Web Page Advertisement, Date Unknow, www.dowdys.com/Tiller.htm.

* cited by examiner

Primary Examiner—Robert E. Pezzuto
Assistant Examiner—Alexandra Pechhold
(74) Attorney, Agent, or Firm—Nicholas A. Kees; Godfrey & Kahn, S.C.

(57) ABSTRACT

A grooming apparatus, for sloping, aerating and fluffing bedding material in livestock free stalls, is attached to a vehicle such as a skid steer. The grooming apparatus includes a rotary arm, having grooming members, and connected to the vehicle by a boom. The rotary arm, when viewed across the stalls, is angled at a slope. The grooming members contact the bedding material to fluff and aerate it, and arrange it according to the slope. The rotary arm, when viewed from the end of a stall, may be pitched forward or rearward. These pitches and angles permit the grooming members to more effectively move the bedding material within each stall to create the slope. Such a slope is beneficial for livestock that prefers a sloped bed. Using the boom, the rotary arm can be moved up and/or out of the way when the vehicle is moved through doorways and the like.

20 Claims, 9 Drawing Sheets

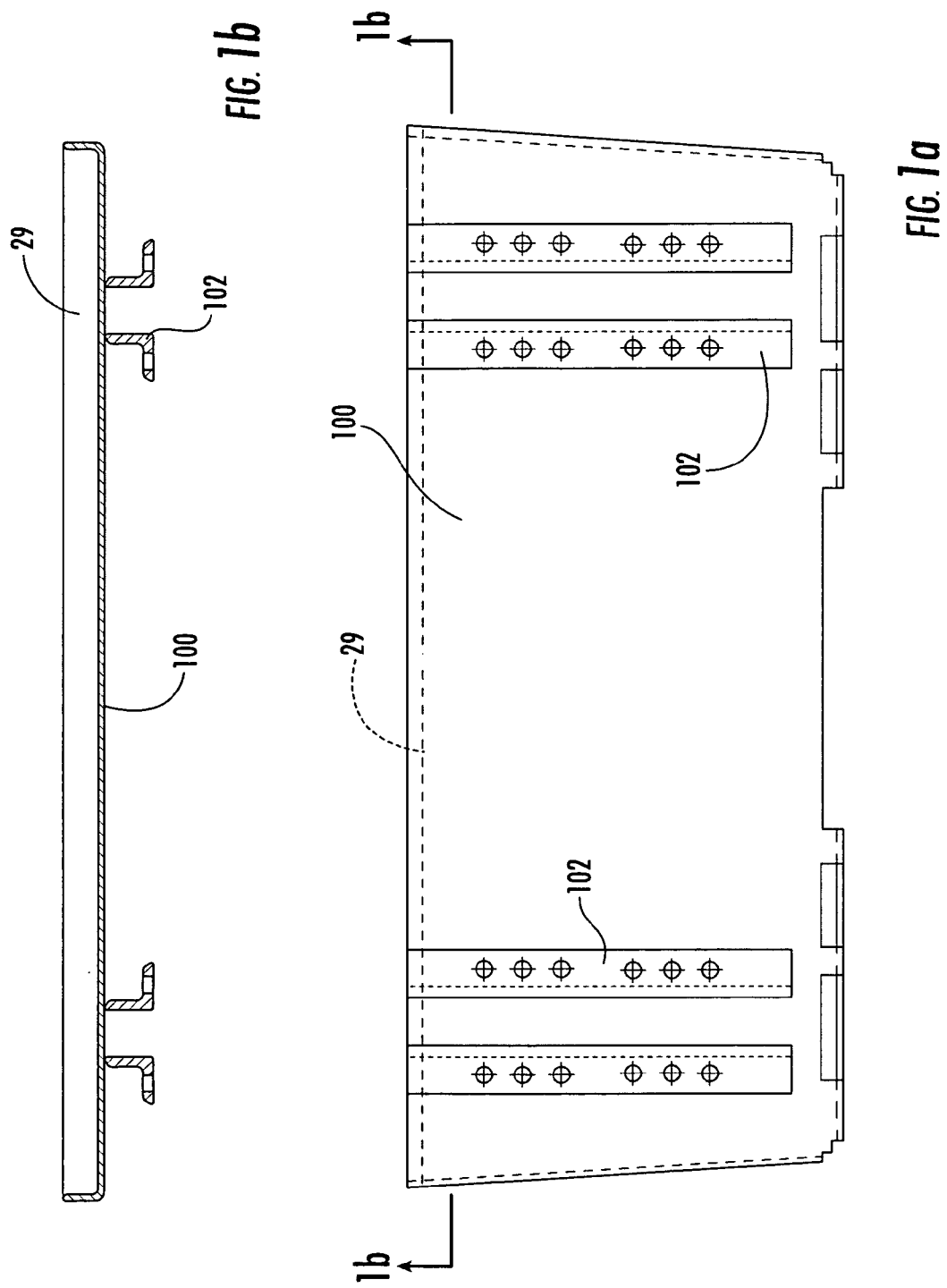

ANIMAL BEDDING GROOMER

BACKGROUND OF THE INVENTION

The present invention relates generally to animal farming, and more particularly to an apparatus for manipulating the bedding material in an animal stall.

In the larger animal farming operations today, animals are kept in stalls that are generally separated by railings. Cows in particular are kept in these types of stalls, commonly know as "free stalls." These stalls are arranged in large rows that are separated by alleys. At the rear of the stall is a relatively short curb, and at the front of the stall, a low wall known as a brisket board. Between the curb and the brisket board is a bedding material such as sand, ground rubber, ground nut shells, sawdust or the like.

After the animal has resided in a free stall for a period of time, the bedding tends get mashed down and arranged in a less than ideal fashion. For example, certain animals such as cows prefer that the bedding slope upward toward the brisket board. After a period of time, the bedding will become mostly horizontal, and some of it will have spilled over the curb. It is desirable to groom the bedding for several reasons. First, it introduces air into the bedding to dry it and retard growth of anaerobic bacteria. Second, it fluffs the bedding to make it more soft and comfortable. Finally, for animals that prefer a slope, the grooming process should make the bedding sloped in accordance with that preference.

One type of apparatus used to groom animal stalls consists of a hydraulically controlled arm that is attached to the front of a vehicle, such as a farm tractor or a skid steer loader, the latter hereafter referred to simply as a "skid steer." The arm may be raised to fit though narrow doors or the like, and may be lowered so that it is substantially horizontal with the stall floor. Four or five propeller-like blades are spaced along the length of the arm. Each propeller-like blade rotates independently of the others. As the skid steer proceeds along a row of stalls, the blades are lowered into each stall to stir the bedding. However, the bedding remains substantially horizontal. Further, if a large rut is present in a stall, the propeller blades may not move enough bedding to repair the rut adequately. In addition, the arm and propeller-like blades are relatively large, and cannot fit under rails used to commonly separate each stall. Thus, the groomer must stop and groom each stall individually instead of continuously grooming each consecutive stall as the groomer proceeds along the alley.

In an effort to solve the problem with the sloping and rut repair, a similar apparatus was developed by the present inventor. Rather than use a plurality of propeller like blades, one large rotating member was used. This member had several fixed fins spaced along its length. As the skid steer proceeded along the stalls, the member rotated by means of a motor with a gear box. The fins could move sand from the rear of a stall toward the front of a stall to repair ruts better than prior apparatus. However, the fins could not move the sand in a manner that was effective to create the slope that is desired. Further, though this apparatus had the ability to continuously groom each consecutive stall as the groomer proceeded along the alley, it could only do so if the rails separating the stalls were raised up from the bedding so that the rotating member and corresponding motor could fit underneath the rails. Because stall rails are fixed rather than adjustable, this would mean that pre-existing stalls would need to undergo some level of construction to accommodate the groomer. This may not be desirable. Moreover, it is not desirable to raise the rails separating the stalls because the animals, when lying down, may spread out and not stay contained within their own stall.

Thus, there is a need for an apparatus for animal stall grooming that can aerate and fluff bedding, repair ruts and have the capability of providing a slope to the bedding. There is a further need that such apparatus be compact enough to fit underneath the rails commonly used to separate stalls.

SUMMARY OF THE INVENTION

The present invention relates to an improved animal stall groomer that is particularly useful for moving bedding to not only aerate and fluff the bedding, but also to create a significant slope in the bedding. The apparatus can be attached to the front of a vehicle such as a skid steer. A boom extends from the skid steer to the animal stall. A second rotary arm is rotatably connected to the first arm so that it does not extend beyond the rear and forward confines of the stall, as defined by the curb and brisket board. Several fins or shovels are spaced along the length of the second rotatable arm. Varying degrees of bedding can be moved from the rear of a stall to the front of a stall by adjusting the angle at which the rotary arm contacts the bedding.

Various other features, objects, and advantages of the invention will be made apparent to those skilled in the art from the following detailed description including illustrative examples setting forth how to make and use the invention.

BRIEF DESCRIPTION OF DRAWINGS

FIG. 1a is a partial front elevational view showing in greater detail the panel and brackets of the apparatus of FIG. 1;

FIG. 1b is a cross-sectional view of the panel and brackets taken at line 1b—1b in FIG. 1a.

DESCRIPTION OF THE PREFERRED EMBODIMENT

Figure 1:
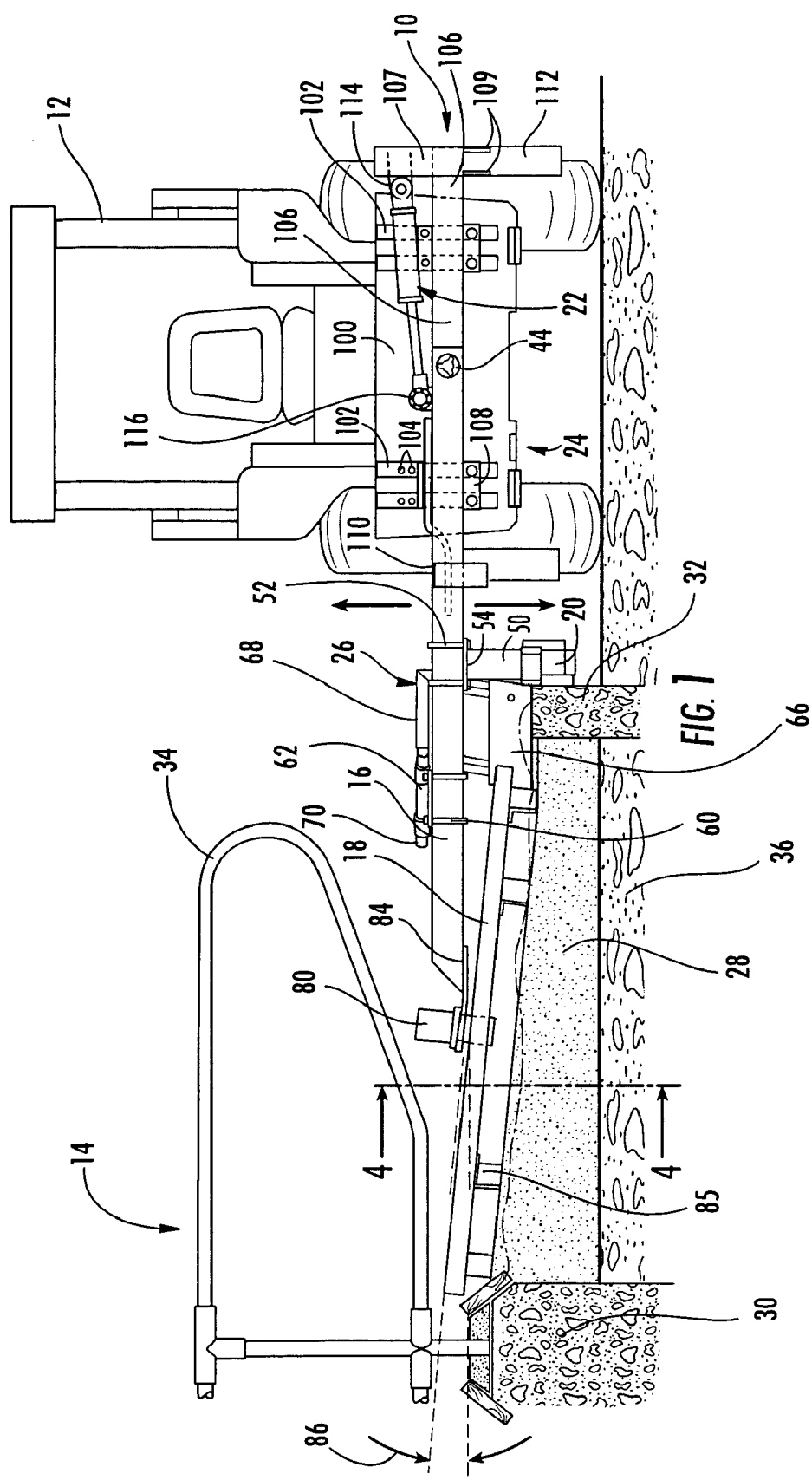
FIG. 1 is a front elevational view of the grooming apparatus of the present invention, with the rotary rake arm engaging bedding in an animal stall.
Figure 2:
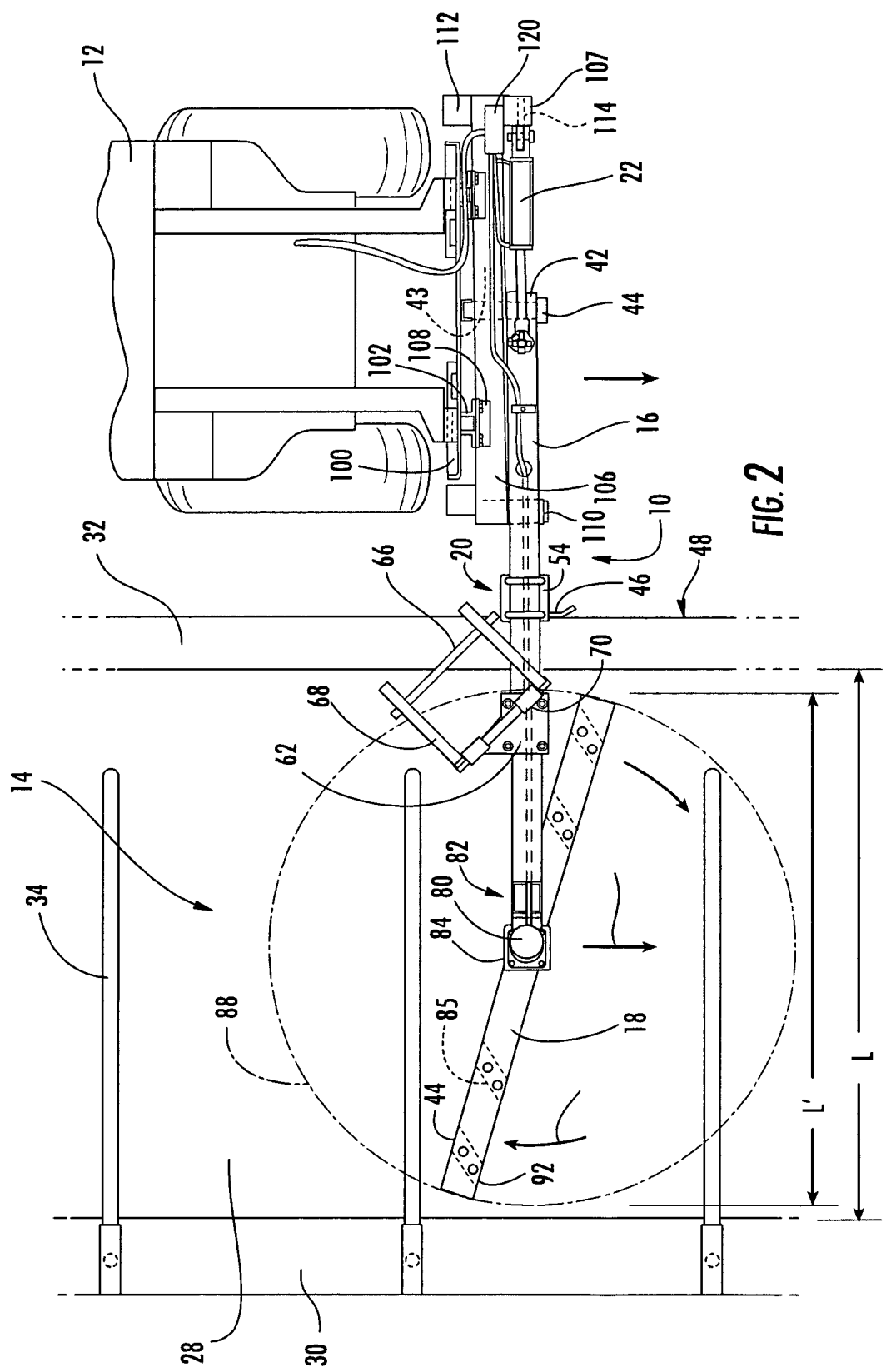
FIG. 2 is a plan view of the grooming apparatus of FIG. 1.

Referring now to FIGS. 1 and 2, the present invention provides an animal stall groomer 10, which may be selectively or permanently attached to a vehicle 12, and making contact with bedding 28 contained in a row of free stalls 14. Generally, the groomer 10 apparatus is constructed from a boom 16, a rotary arm 18, a curb guide 20, and a lifting actuator 22. The groomer 10 is attached to the vehicle 12, such as a skid steer or the like, with an adaptor assembly 24. A scraper assembly 26 may be attached to the boom 16 for scraping bedding material 28 back into the free stalls 14.

Free stalls 14 are the type of animal stalls typically used in the dairy industry. Free stalls 14 are arranged in long rows defined by a brisket board 30 at the head end in generally parallel relation to a curb 32 at the tail end, and the stalls are separated from each other by railings 34. The brisket board 30 may be a low wall that will generally be taller than the curb. The livestock in the stalls, such as cows, are separated from one another by the railings 34. Though there are footings located underneath the curb 32 and brisket board 30, there is generally only a dirt floor 36, that is, soil, underneath the bedding 28, for drainage purposes. The bedding 28 generally fills the volume between the curb 32 and brisket board 30, above the floor 36. The bedding 28 is either sand, ground rubber, ground nut shells, sawdust or the like, or even straw. Some of these materials absorb moisture more readily than others, and some pack down more solidly than others. However, it is desirable to aerate and fluff any type of bedding material to keep it sanitary and comfortable.

Figure 3:
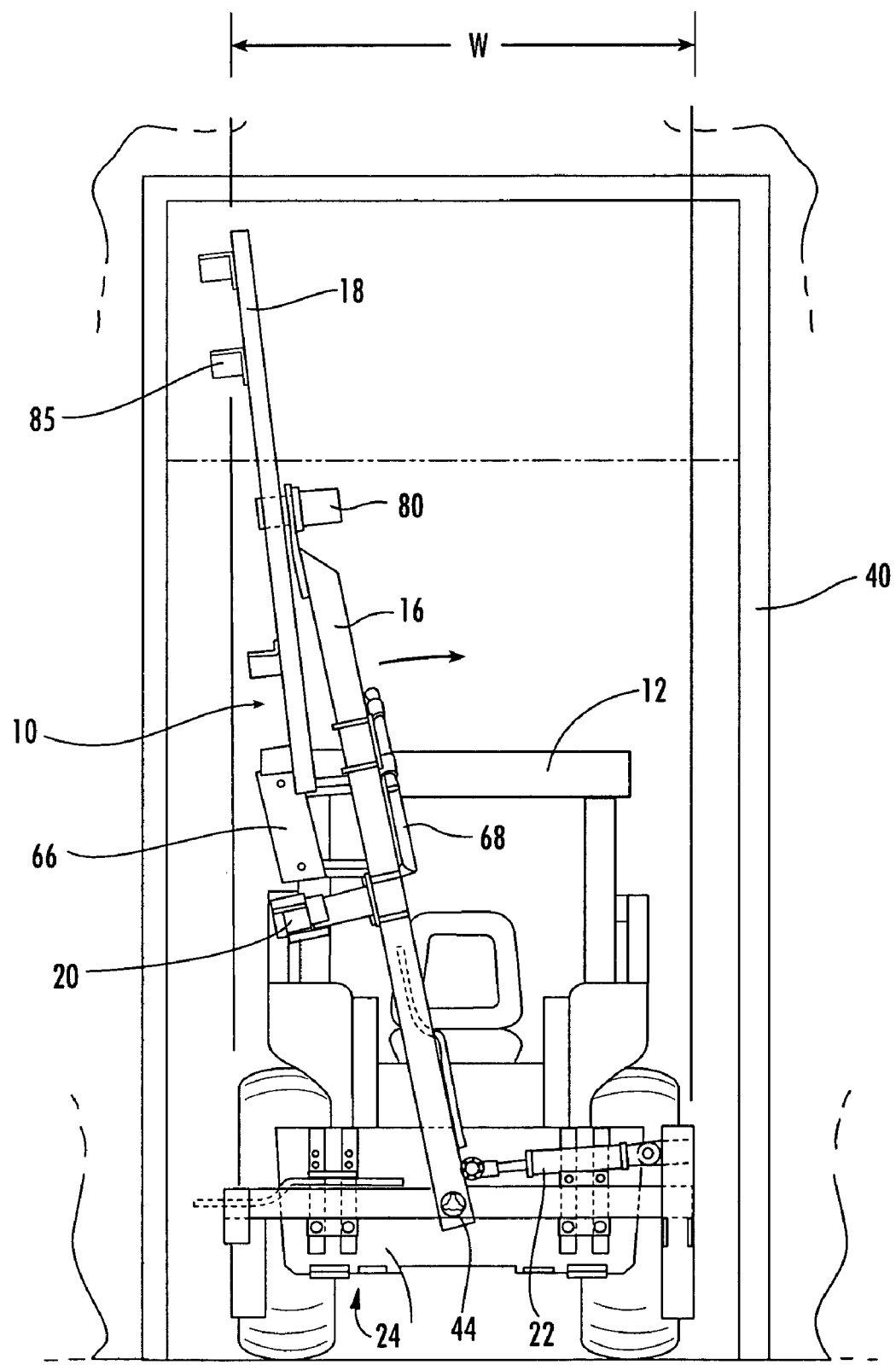
FIG. 3 is another front elevational view of the grooming apparatus of FIG. 1, with the rotary rake arm in a stowed position.

In FIGS. 1 and 2, groomer 10 is shown in a working position. In contrast, FIG. 3 shows groomer 10 in a stowed or raised position. Preferably actuator 22 is retracted to raise the boom 16 along with rotary arm 18 so that groomer 10 does not extend significantly beyond the width "W" of vehicle 12. This allows the vehicle 12 to fit through relatively narrow passages such as a barn door 40 or between rows of free stalls 14.

As indicated above, the invention contemplates that the groomer 10 may be attached to any suitable vehicle having the ability to raise and lower, and possibly even rotate, an accessory, and in addition having an auxiliary hydraulic circuit. Examples of such a vehicle includes a farm tractor, or even have a vehicle dedicated to the use of the groomer 10, and it is most preferable to attach groomer 10 to a vehicle commonly called a skid steer 12. Conventional skid steers are capable of having various attachments connected thereto, such as buckets and plow blades, and further have the capability of rotating such attachments about an axis that is parallel to the front wheel axis of the skid steer 12, as contrasted to the rotation that can be seen by comparing FIGS. 1 and 3. Thus, when groomer 10 is attached to a skid-steer or equivalent vehicle, the boom 16 can be rotated forward from a substantially vertical position shown in FIG. 3, to a substantially horizontal position extending outwardly from the front of the skid steer. Using this same capability, with the boom 16 in the generally horizontal operating position shown in FIGS. 1 and 2, the skid steer 12 can adjust the pitch of the rotary arm 18 as described herein.

Referring again to FIG. 2, boom 16 is described in greater detail. Boom 16 is the primary structural component of groomer 10. A proximal end 42 of boom 16 is pivotally connected to the adaptor assembly 24, described below. While there are many ways to accomplish this connection, a preferred way is to attach arm 16 to a pin 43 that is rigidly connected to a saddle member 106, described herein. So that boom 16 does not inadvertently detach from the pin 43, a washer 44 is selectively connected to pin 43 with a suitable fastener.

Referring to FIGS. 1 and 2, the curb guide 20 is attached to boom 16 so that it may be selectively placed along the body of boom 16 between the ends. The purpose of curb guide 20 is to keep the rotary arm 18 within the length "L" of free stalls 14 as the vehicle 12 moves in parallel relation to curb 32. Curb guide 20 is most preferably constructed from a flat shoe 46 that is pivotally connected to a leg 50 in a manner that permits the shoe to rotate up to about 20 degrees with respect to the leg. Leg 50 is selectively connectable to the body of boom 16 by any suitably selective connection. In the embodiment shown, at the top of shaft 50 is a flange member 54, to which a pair of brackets 52 or the like may be attached. This selective attachment permits the use of curb guides of different height configurations attached to boom 16, which in turn allows the curb guide 20 to be positioned along boom 16 to accommodate different length rotary arms 18. Preferably, after curb guide 20 is positioned on boom 16, brackets 52 are bolted to flange 54 so that the curb guide 20 cannot freely slide along the length thereof. If the curb guide 20 should touch the floor, more bedding material should be added to the free stalls 14.

The pivotability of shoe 46 permits it to "float" against the exposed side 48 of curb 32. Further, it is preferable that the fore and aft edges of shoe 46 are bent outwardly away from curb side 48. This shoe configuration, combined with the ability to pivot, prevents shoe 46 from catching on any protrusions which may occur on curb 32. It further allows the operator of the skid steer 12 to approach the curb 32 at a slight angle.

As indicated above, a scraper assembly 26 may be attached to the boom 16 for scraping bedding material 28 from the curb 32 back into the area of the free stalls 14. Preferably, like curb guide 20, the position of scraper assembly 26 is slidably adjusted along the length of boom 16. The scraper assembly 26 includes a scraping blade 66 attached to the boom 16 so that it is oriented at an angle with respect to the lengthwise direction of curb 32. An angle of roughly 45 degrees is most efficient to push or plow any bedding material that happens to be on top of the curb 32 back into the area of the free stall 14.

On certain occasions the curb 32 has a top surface that is not horizontal as shown in FIG. 1, but rather is angled, from a high point at the edge of curb 32 away from the free stall 14, to a low point at the edge of the curb nearest the free stall. The low point may even be lower than the level of the bedding 28, so that a smooth transition is provided from the bedding to the curb 32. In the preferred embodiment the blade 66 includes a mounting that can accommodate such an angled curb, such as mounting slots or multiple mounting holes (not shown).

The scraper assembly 26 further includes a pair of L-shaped arms 68, at one end rigidly connected to a rear surface of blade 66 to provide support thereto, and at an opposite end, rotatably connected to a hinge member 70. Most preferably, hinge member 70 is spring-biased, which in turn means that the blade 66 is spring-biased to bear against curb 32. Hinge member 70 is rigidly attached to mounting plate 62. A pair of brackets 60 or the like may be used to selectively clamp the mounting plate 62 to boom 16. Preferably, arms 68 are arranged at an angle to boom 16, so that blade 66 has the effect of scraping material from the curb surface. As the bedding material height changes, the spring biasing of hinge member 70 permits the pitch of blade 66 to also change to accommodate the change in height.

Of course, other equivalent methods of selective attachment may be used to connect curb guide 20 and scraper assembly 26 to boom 16. For example, each component may slide within a slot on boom 16, or perhaps only a single bracket may be used. Quick connections may be used so that several bolts do not have to be loosened and tightened for each adjustment. Further, it may be desirable to use an incremental type of adjustment rather than the continuous adjustment just described. Such improvements to the basic adjustable connections shown in respect to curb guide 20 and scraper assembly 26 are considered to be within the scope of this invention.

Still referring to FIGS. 1 and 2, a motor 80 is attached to the distal end 82 of the boom 16. The rotary arm 18 is attached to the motor and is rotated thereby. It is important that, together, motor 80 and rotary arm 18 have a low profile, to allow the rotary arm to fit under stall rails 34 during operation of the groomer 10.

When rotary arm 18 rotates, it does so within a plane 88 as suggested by the phantom lines in FIG. 2. As described below, grooming members, or more specifically, shovel members 85, are spaced along the length of rotary arm 18. Preferably, shovel members 85 have rounded leading edges. It should be understood that different types of grooming members can be used e.g., tines, forks, etc., and that they do not necessarily need to be attached to a bottom side of rotary arm 18. It may be desirable to have optional sets of grooming members that can be easily switched. The combined height of the rotary arm 18 and grooming members is preferably less than about 12.7 cm (5 inches), and most preferably less than about 9 cm (3.5 inches). This allows the rotary arm to fit under most stall rails 34.

Preferably, a bracket 84 is used to attach motor 80 to boom 16 at a pre-determined angle 86 (as viewed from the front of the vehicle 12, or across the stalls 14), this angle preferably about 5 degrees with respect to the floor 36. This angle 86 represents the "roll angle" of the plane 88. The roll angle 86 can be adjusted by switching to a bracket 84 having a different predetermined angle 86, e.g. about 1–15 degrees. Alternatively, the bracket 84 may itself be adustable by way of a hinge or the like.

Figure 4:
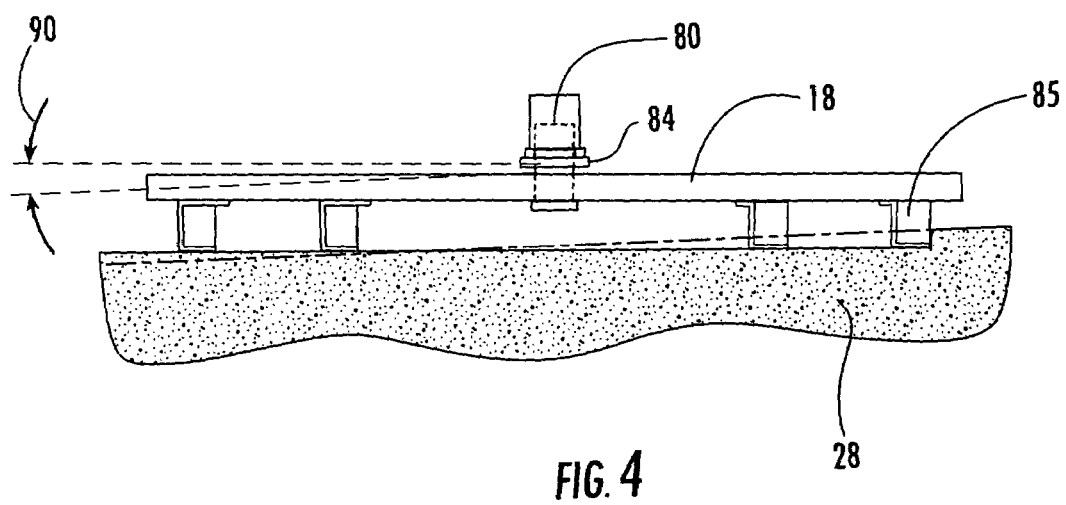
FIG. 4 is side elevational view of the rotary rake arm, taken at lines 4—4 of FIG. 1.

Likewise, referring to FIG. 4, the bracket 84 is used to attach motor 80 to boom 16 at a pre-determined angle 90 when viewed from the side of the vehicle 12. Most preferably, however, the pre-determined angle 90 is 0 degrees. To adjust the "pitch" angle of the rotary arm 18, as indicated above, the skid steer 12 may rotate the boom 16 so that the plane 88 in which the rotary arm 18 rotates is pitched forward or rearward. When the plane 88 is pitched forward, it is considered to be a negative pitch.

Referring again to FIG. 2, shovel members 85 are shown as flat blades attached to rotary arm 18 at roughly a 45 degree angle. Preferably, shovel members 85 are bolted to rotary arm 18, and may be replaced if damaged or worn. Rotary arm 18 preferably rotates in a clockwise direction in order to move bedding from the region of curb 32 towards the region of brisket board 30. Preferably, thinking in terms of the rotational motion of the rotary arm 18, a rearward edge 92 of each shovel member 85 is further from the rotational center of the rotary arm than the forward edge 94 of the shovel member. The orientation of shovel members 85 with respect to rotary arm 18 may be uniform. Alternatively, those shovel members 85 located closest to the motor may be oriented at a greater or lesser angle.

It should be noted that shovel members 85 are preferably oriented on rotary arm 18 so that they push the bedding material rather than dig into the bedding material. If the shovel members are oriented to dig into the bedding, the rotary arm could more easily become caught on items commonly buried in the bedding to prevent the animals from digging, e.g. tires.

Roll angle 86 and pitch angle 90 are adjusted to achieve the desired degree of slope to the bedding surface. As the pitch angle 90 and roll angle 86 are increased, the shovel members 85 move more bedding from the region of curb 32 to the region of the brisket board 30. Thus, a greater slope of the bedding can be achieved.

Figure 7:
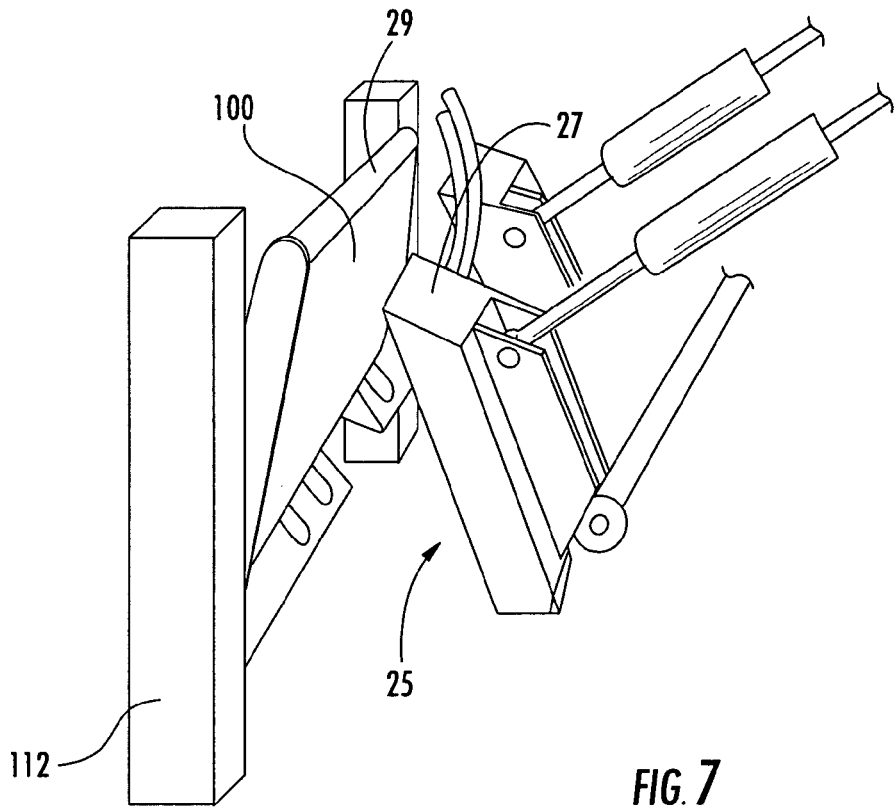
FIG. 7 is a partial side-perspective view of the grooming apparatus of the present invention, just prior to mounting the adapter plate to a mounting plate of a skid steer.

Referring to FIGS. 1, 2 and 7, as indicated above, adapter assembly 24 is used to indirectly attach the groomer 10 to vehicle 12. Adapter assembly 24 is constructed from a panel 100 preferably formed from sheet metal so that it is lightweight yet durable. For aesthetic and safety reasons, some or all of the panel 100 edges may be bent or rolled over. In a preferred embodiment, panel 100 is connected to the mounting plate 25 of a skid steer, the skid steer being the most preferred vehicle 12. Panel 100 may have a lip 29 constructed to receive the shoes 27 of mounting plate 25. Other connector configurations may be necessary or desirable depending on the type of vehicle 12 used with groomer 10.

Again in the preferred embodiment brackets 102 are attached to the front surface of panel 100, and may be made from a two pairs of angle iron that are welded or otherwise affixed to the front surface of panel 100. Brackets 102 are used to mount a saddle member 106 to panel 100, as described herein. As viewed from the top edge of panel 100 (see FIGS. 1a and 1b), brackets 102 are in generally parallel relation and arranged symmetrically to form a channel between the brackets 102. Preferably, a series of apertures 104 are identically spaced along the length of each bracket 102. The purpose of the apertures 104 is to accommodate different height/type of vehicles 12 and/or different styles of adapter assemblies 24.

A saddle member 106 is selectively attached to the front of panel 100 so that the saddle member is in a horizontal position. Preferably, two pairs of bars 108 are attached to saddle member 106 by welding or the like, the bars 108 positioned horizontally on opposite surfaces of saddle member 106 so that the ends of each pair of bars 108 are aligned. Each bar 108 has a pair of apertures therein that coincides with the apertures 104 on each bracket 102. Thus, saddle member 106 may be selectively attached to brackets 102 with bolts or the like, at various incremental heights. Preferably, an arm 110 extends outwardly from saddle member 106 to support the boom 16 when groomer 10 is in use.

As an alternative to the angle iron construction of brackets 102 they may also be constructed from other equivalent structures and materials such as solid blocks of material. Similarly, saddle member 106 may be constructed from channel stock or the like. In addition, shims or wedges (not shown) may be placed between the brackets 102 and saddle member 106 to adjust the angle at which the saddle member is held. Shims and wedges used in this way have two main functions. First they allow users to attach the groomer 10 to different skid steers or vehicles 12 so that when the boom 16 is an upright stowed position, the scraper assembly 26 will not hit the vehicle 12 cab or the like. Second, the use of shims or wedges is one method of positioning the saddle member 106 parallel to floor, which is desirable.

Figure 8:
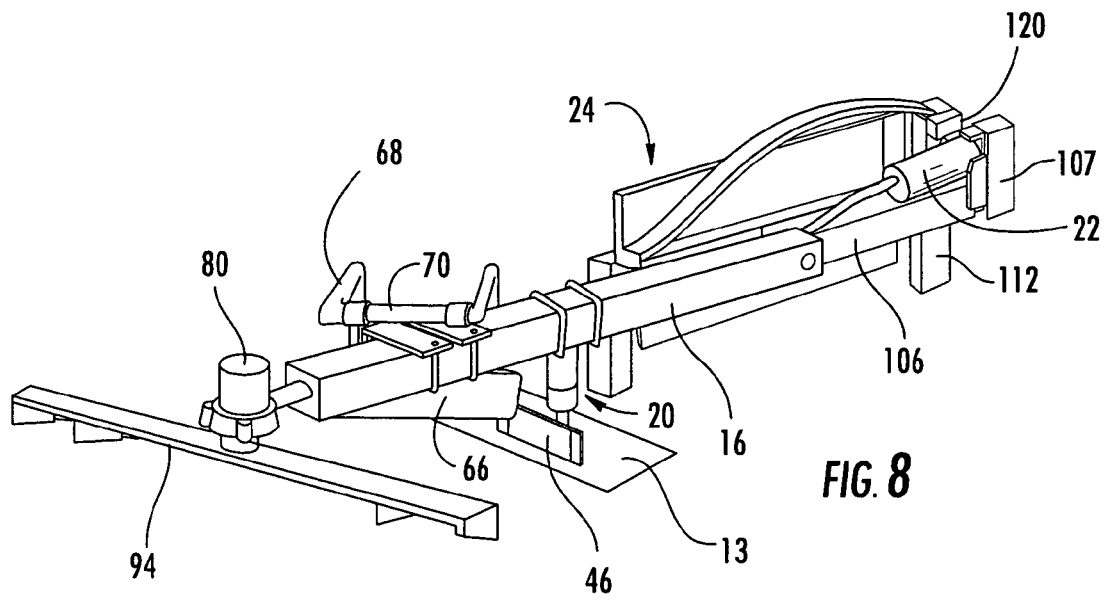
FIG. 8 is a perspective view of the grooming apparatus in FIG. 1, removed from a vehicle and supported by a parking stand.

Referring to FIGS. 1, 2 and 8, as indicated above, actuator 22 functions to raise and lower boom 16, that is, when actuator 22 retracts, boom 16 is raised from a horizontal position to an upright position (FIG. 3). Actuator 22 is attached at one end to a bracket 116 extending from the boom 16, and at the opposite end to an ear 114 that extends from bracket 107. The bracket 107 may be attached to saddle member 106. Likewise, a vertical support 112 may be attached directly across from bracket 107, on an opposite side of saddle member 106. A pair of gussets 109 may extend between the underside of saddle member 106 and vertical member 112 to provide reinforcement should member 112 be subjected to a side force. Welding is the preferred method of attaching bracket 107 and member 112 to saddle member 106.

Preferably, vertical member 112 is made from solid metal so that it has sufficient mass to act as a counterbalance, mainly when attaching the groomer 10 to or detaching the groomer from vehicle 12. Weights may be added to vertical member 112 to provide further counterweight. Member 112 also serves as a parking leg when the groomer 10 is detached from vehicle 12.

Most preferably, the actuator 22 and motor 80 are powered hydraulically from a single source of hydraulic fluid and pressure, generally the auxiliary hydraulic output commonly provided by many models of skid steer 12. The problem is that, with that single hydraulic source, both actuator 22 and motor 80 must be operated, and actuator 22 needs to be actuated in both directions, one to lower boom 16, and one to raise the boom. In order to achieve a particular rotational speed, the motor 80 is supplied with hydraulic fluid at a particular rate. The particular motor 80 used by the inventor was obtained from White Hydraulic, Incorporated, Model 420750P3122AAAAA. In the usage described for the present invention, the motor 80, and therefore the rotary arm 18, rotates at about 40 RPM. If it rotates substantially faster than 40 RPM, too much bedding may be thrown out of the stall. If it rotates at substantially less than 40 RPM, then the groomer 10 may move too slowly. For most hydraulic motors to achieve a particular rotational speed, hydraulic fluid must be supplied at a specific rate. For the motor 80 set forth above to rotate at about 40 RPM, it must be supplied with hydraulic fluid at a rate of about 8 gallons per minute (GPM).

Figure 5:
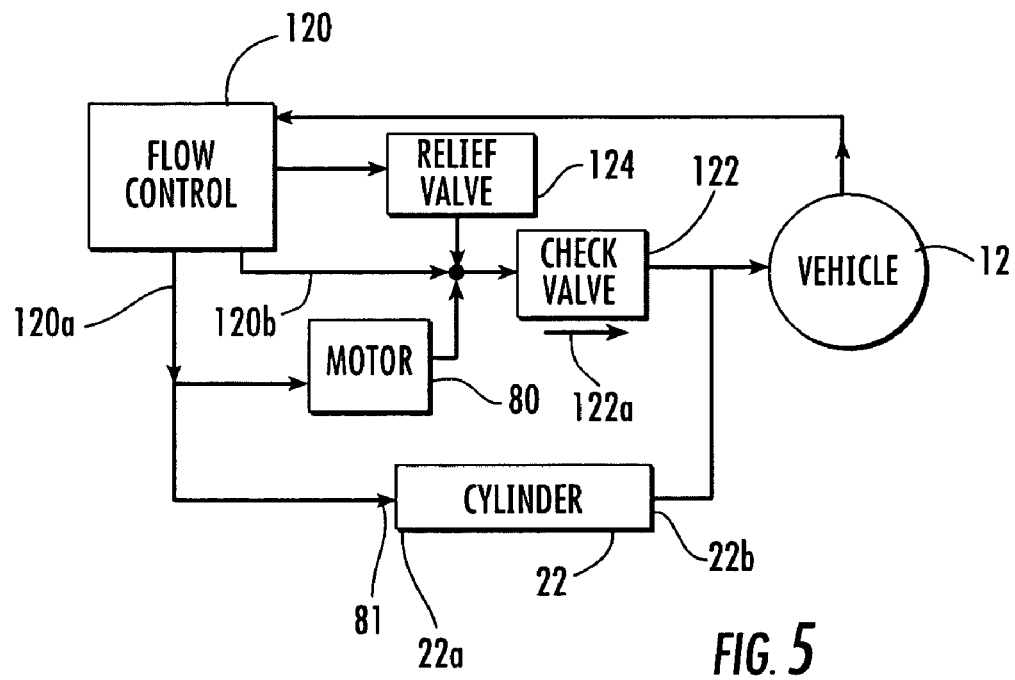
FIG. 5 is a schematic diagram of the hydraulic system of the grooming apparatus of the present invention, when the rotary rake is positioned to engage the bedding.

Referring to FIG. 5, hydraulic fluid is generally delivered from the single source of vehicle 12 at a rate of about 8 to 25 GPM, and is distributed through the hydraulic circuit there shown. The circuit includes a flow control 120. The particular flow control used by the inventor was obtained from Prince Manufacturing Corp., Model No. RD-405R-8. Flow control 120 delivers the predetermined amount of fluid to its first outlet 120a, that is, about 8 GPM, and returns the remaining fluid to vehicle 12 through its second outlet 120b, via a check valve 122. Check valve 122 permits flow only in the direction 122a from flow control 120 toward vehicle 12. The flow control 120 is provided with a relief valve 124, that opens and allows further fluid to flow into check valve 122 and back to vehicle 12, should the pressure within the flow control rise above a certain level, e.g. 1200 psi.

When the boom 16 is being lowered, fluid flows from first outlet 120a, besides to the motor 80, in a direction 81 toward and into the base end 22a of actuator 22, causing the actuator rod to extend and the boom to lower. At the same time, fluid exits the rod end 22b of the actuator 22 and returns to the fluid source at vehicle 12. When the boom 16 is fully lowered, and the actuator 22 is thus fully extended, no further fluid can flow into actuator 22, causing the fluid flow in direction 81 to stop. This stoppage increases fluid flow at the inlet of the motor 80, and the motor begins to rotate, in turn beginning to rotate rotary arm 18 (FIG. 1). As shown in FIG. 3, the boom 16 may be stowed in its raised position at an angle just less than vertical, in order to reduce the hydraulic fluid pressure required to lower the boom. To prevent boom 16 from dropping too abruptly, a restrictor may be placed on actuator 22 to govern the movement of the actuator rod.

Figure 6:
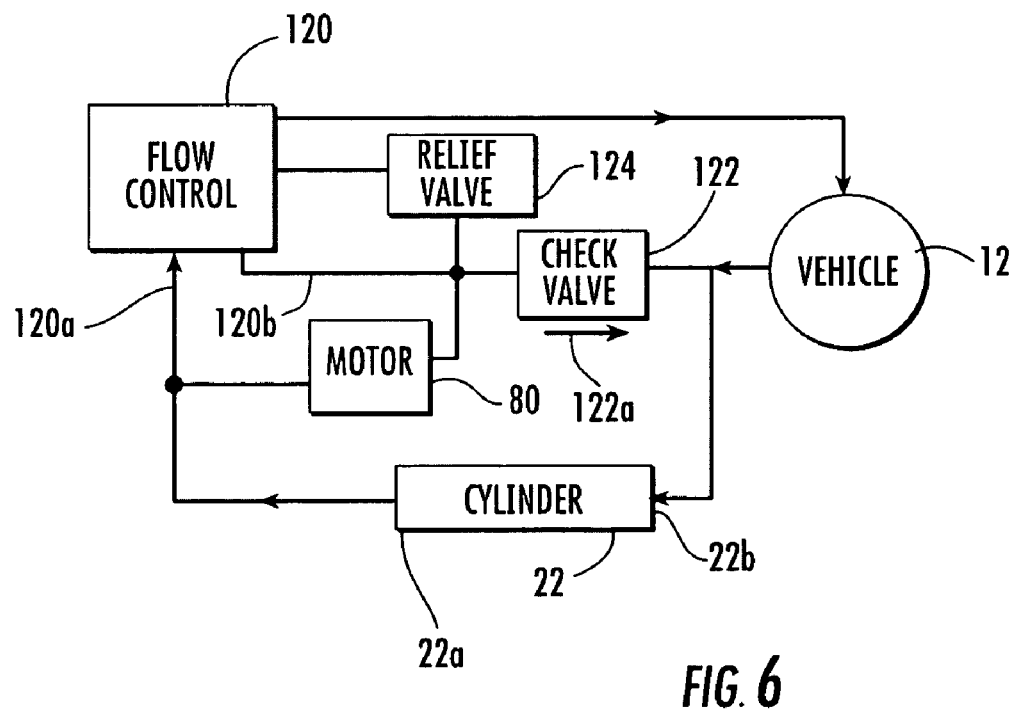
FIG. 6 is a schematic diagram of the hydraulic system of the grooming apparatus of the present invention, when the rotary rake is in a raised position.

As shown in FIG. 6, when boom 16 is being returned to its raised or stowed position, the flow direction of hydraulic fluid is reversed by vehicle 12, as compared to the flow in FIG. 5. This reversal of flow has the effect of causing fluid to flow into the rod end 22b of actuator 22, as the check valve 122 prevents flow from the vehicle 12 toward the motor 80. Fluid then flows out from the base end 22a of the actuator, returning to vehicle 12 via flow control 120. Because fluid pressure is greater on the "stop" side 122b of the check valve 122 than on the flow side 122c, fluid does not flow into motor 80 as indicated above, and the rotary arm 18 does not rotate in this mode.

As described above, motor 80 and actuator 22 are most preferably hydraulic. However, it may be desirable to use other types of components, e.g. electric or pneumatic. The choice will likely be governed by the type of vehicle used in conjunction with groomer 10. In addition, the preferred materials for constructing the blades 66, shoe 46 include abrasion resistant steel, whereas the shovel members 85 should preferably be formed of mild steel or the like.

Figure 9:
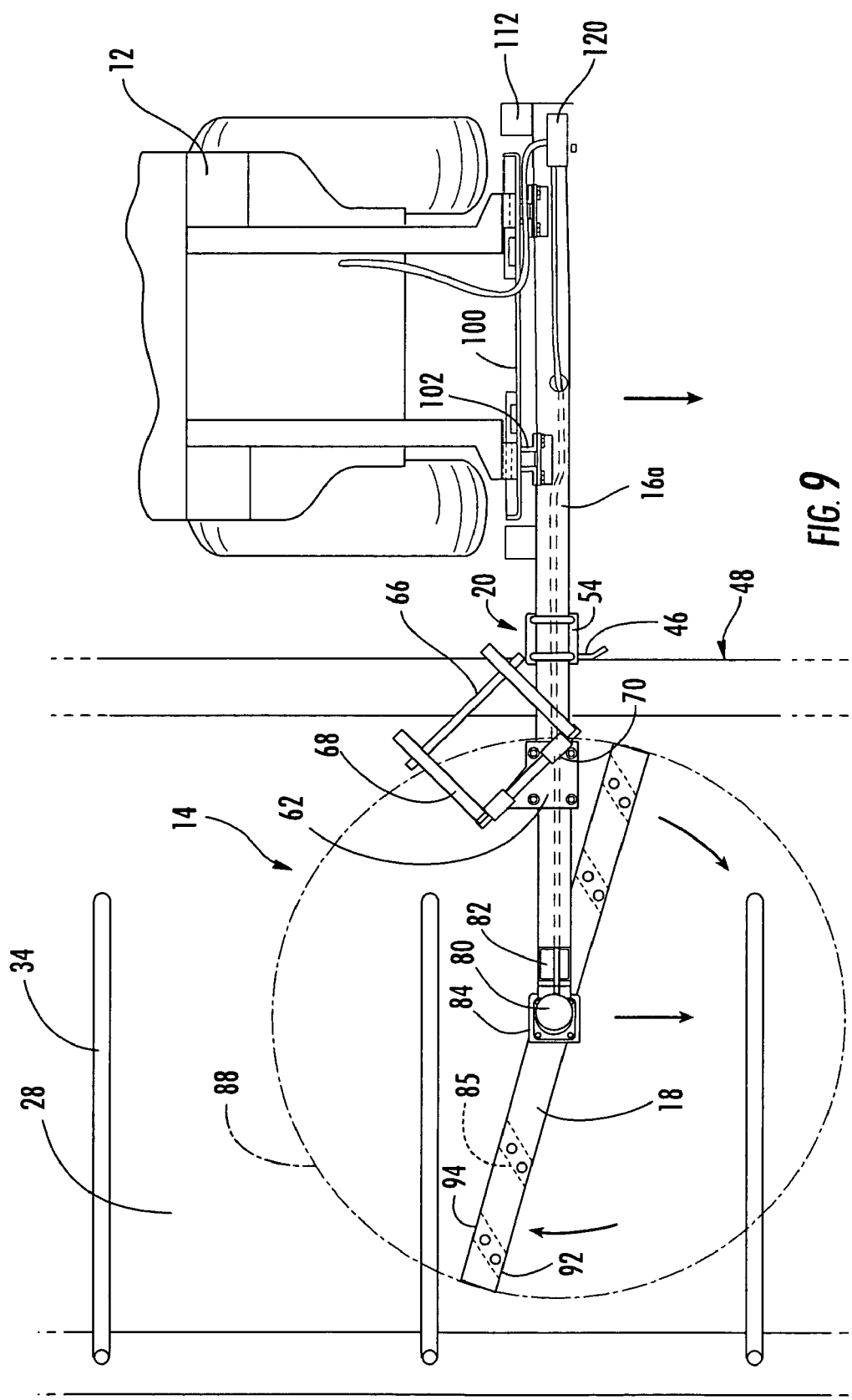
FIG. 9 is a plan view of another embodiment of the apparatus of the present invention, the apparatus having a fixed boom.

In an alternative embodiment of the present invention, shown in FIG. 9, the boom 16a is fixed to panel 100 in a substantially horizontal position. Therefore, in this embodiment, there is no need for actuator 22. Rather, the boom 16a is attached directly to brackets 102 just as the saddle member 106 was connected in the previous embodiment. Most other aspects of groomer 10 remain the same.

Because there is no need to reverse the direction of flow of the hydraulic fluid in the groomer of FIG. 9, another hydraulic feature may be added. For example, a boom 16a could be designed to telescope in length using a hydraulic actuator (not shown). Of course, boom 16a could be designed to manually telescope in length (also not shown).

It is further conceivable that one skilled in the art may add auxiliary hydraulic sources to the apparatuses of FIGS. 1–10 to obtain even more automated features. For example, the boom 16, 16a or 16c could be telescoped. Boom 16, 16a, 16c could be raised during the grooming operation. Curb guide 20 and/or scraper assembly 26 could be adjusted in position along the length of boom 16. Further, saddle member 106 or boom 16a, 16c could be raised and lowered.

Figure 10:
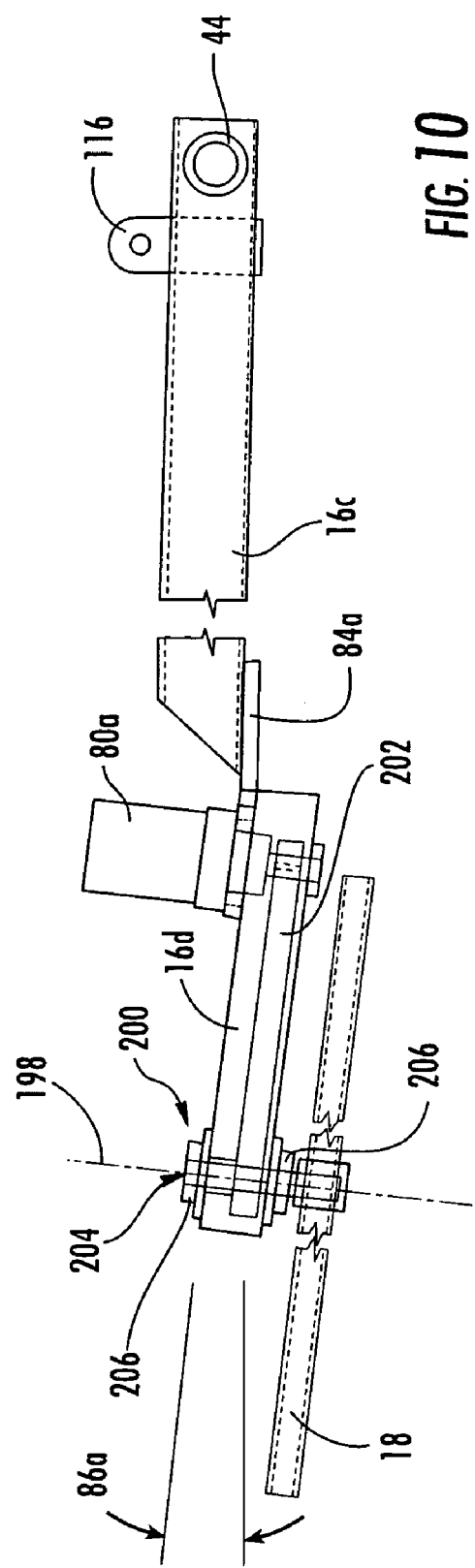
FIG. 10 is partial side elevation of another embodiment of the apparatus of the present invention, showing the motor mounted away form the rotational axis of the rotary arm.

In yet another embodiment of the present invention, as seen in FIG. 10, the motor 80a is distanced away from the rotational axis 198 of rotary arm 18. An advantage of this embodiment is that rotary arm 18 can pass under relatively low stall rails 34 because the motor is farther away from the rotational axis of rotary arm 18. In this embodiment, a motor 80a is connected to a chain case 200 by a chain 202, shown schematically in FIG. 10. Of course, a belt could be used instead of a chain 202.

So that the chain 200 (or belt) is properly aligned with chain case 200, the boom is split into a two parts, namely boom 16c and arm 16d. The proximal end of arm 16d is connected to boom 16c by a bracket 84a. Like bracket 84 of the first embodiment of the present invention, it is bent at an angle 86a, preferably at 1–15 degrees. Bracket 84a could also be made to be adjustable (not shown). Rotary arm 18 (schematically shown) may be connected to the chain case 200 by a spindle 204 that is rotationally supported by a pair of bearing assemblies 206. Motor 80a may be connected to the proximal end of arm 16d at bracket 84a, or if desired, motor 80a could be mounted anywhere along the length of arm 16d (not shown). The embodiment shown in FIG. 10 could be used with a fixed boom 16b rather than a rotatable boom 16.

In operation, the user attaches the groomer 10 to a vehicle 12. The saddle member 106 is positioned so that when boom 16 is resting against arm 110, the rotary arm 18 and grooming members such as shovels 85 are at a desired height with respect to the bedding material. Curb guide 20 and scraper assembly 26 are adjusted to that they are positioned properly with respect to curb 32. The motor 80 is actuated so that the rotary arm 18 rotates.

The operator grooms the rows of free stalls 14 by maintaining the curb guide 20 against curb 32 as the vehicle moves in a forward direction. The relatively low-profile motor 80 and rotary arm 18 will fit under most stall rails 34. The same is true for motor 80a, arm 16d and rotary arm 18 of the alternative embodiment of the present invention.

If desired, the actuator 22 may be retracted to raise the boom 16 upward. This will cease grooming and allow the operator to move through relatively narrow passages. If the groomer of FIG. 10 is used boom 16a cannot be raised or lowered.

When not in use, groomer 10 may be removed from vehicle 12 and stowed as shown in FIG. 8. Preferably, groomer 10 rests on a separate parking stand 13 so that it is supported in a horizontal position. Parking stand 13 may be selectively attached to curb guide 20. Preferably, parking stand 13 has a vertical post that fits inside curb guide leg 50.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. An apparatus for grooming the bedding material in an animal free stall, the animal free stall having a stall rail separating it from an adjacent animal free stall, the apparatus comprising:
   a boom adapted for connection to a vehicle, and having a proximal end and a distal end;
   a rotary arm rotatably attached to the distal end of the boom, the rotary arm having a lower surface with a plurality of grooming members attached to the lower surface for grooming the bedding material, and wherein a plane in which the rotary arm rotates is at an angle of 1–15 degrees with respect to a surface on which the vehicle is resting; and
   a motor for selectively rotating the rotary arm;
   the rotary arm and grooming members together having a sufficiently low profile that the grooming members can groom the bedding material under the stall rail.

2. The apparatus of claim 1 further including an adapter assembly for rotatably connecting the boom to the vehicle; and
   a curb guide attached to the boom to maintain position of the rotary arm with respect to the free stall.

3. An apparatus for grooming the bedding material in an animal free stall, the apparatus comprising;
   a boom adapted for connection to a vehicle, and having a proximal end and a distal end;
   a rotary arm rotatably attached to the distal end of the boom, the rotary arm having a lower surface with a plurality of grooming members attached to the lower surface, and wherein a plane in which the rotary arm rotates is at an angle of 1–15 degrees with respect to a surface on which the vehicle is resting; and
   a motor for selectively rotating the rotary arm;
   an adapter assembly for rotatably connecting the boom to the vehicle; and
   a curb guide attached to the boom to maintain position of the rotary arm with respect to the free stall;
   wherein the adapter assembly comprises:
   a panel adapted for attachment to a vehicle frame with at least one bracket; and
   a saddle member selectively attached to the panel, wherein the boom is rotatably attached to the saddle member.

4. The apparatus of claim 3 further including an actuator connected between the boom and the adapter assembly so that when the actuator is retracted, the boom is raised.

5. The apparatus of claim 4 wherein the motor and the actuator are operated hydraulically.

6. The apparatus of claim 3 further including a scraper assembly attached to the boom, the scraper assembly having a blade for pushing the bedding material back into the free stall.

7. The apparatus of claim 3 wherein a pitch angle of the rotary arm is adjusted by rotating the entire panel.

8. An apparatus for grooming the bedding material in an animal free stall, the apparatus comprising:
   a boom adapted for connection to a vehicle, and having a proximal end and a distal end;
   a rotary arm rotatably attached to the distal end of the boom, the rotary arm having a lower surface with a plurality of grooming members attached to the lower surface, and wherein a plane in which the rotary arm rotates is at an angle of about 5 degrees with respect to a surface on which the vehicle is resting; and
   a motor for selectively rotating the rotary arm.

9. An apparatus for grooming bedding material in barns, the apparatus comprising:
   a boom having a proximal end and a distal end;
   a panel adapted for attachment to a vehicle;
   a saddle member selectively attached to the panel, wherein the proximal end of the boom is rotatably attached to the saddle member;
   a rotary arm rotatably attached to a distal end of the boom, the rotary arm having a lower surface with a plurality of grooming members attached to the lower surface, and wherein the pitch of the rotary arm is adjustable, and the roll ranges from 1 to 15 degrees with respect to a horizontal surface; and
   a motor for selectively rotating the rotary arm.

10. The apparatus of claim 9 further comprising:
    a scraper assembly attached to the boom, the scraper assembly having a blade for pushing the bedding material back into the free stall; and
    a curb guide attached to the boom to maintain position of the rotary arm with respect to the free stall.

11. The apparatus of claim 10 wherein the blade of the scraper assembly is biased so that it can scrape surfaces of varying heights.

12. The apparatus of claim 9 wherein the grooming members are blades attached to the rotary arm at an angle.

13. The apparatus of claim 9 wherein the pitch angle is adjusted by rotating the panel.

14. The apparatus of claim 9 wherein the roll angle is 5 degrees.

15. The apparatus of claim 9 further including an actuator connected between the boom and the adapter assembly so that when the actuator is retracted, the boom is raised.

16. The apparatus of claim 15 wherein the motor and the actuator are hydraulically controlled from a single source of hydraulic fluid.

17. The apparatus of claim 15 wherein the rotary arm and grooming members have a combined height of less than 12.7 centimeters.

18. A method of grooming animal free stalls having a curb, comprising the steps of:
- attaching the grooming apparatus of claim 9 to a vehicle;
- adjusting the pitch of the rotary arm;
- actuating the motor to rotate the rotary arm; and
- moving the curb guide along the curb.

19. A rotary arm for a grooming apparatus for grooming animal bedding in connection with a plurality of adjacent animal free stalls, at least some adjacent pairs of animal free stalls separated by the at least one stall rail, the apparatus having a boom, and a motor for rotating the rotary arm, the rotary arm comprising an elongated member having a plurality of grooming members attached at spaced intervals along at least one side of the elongated member, the rotary arm and grooming members together having a sufficiently low profile that the grooming members can groom the bedding material under the stall rail.

20. An apparatus for grooming bedding material in barns, the apparatus comprising:
- a boom having a proximal end and a distal end;
- an arm having a proximal end and a distal end;
- a bracket connecting the distal end of the boom to the proximal end of the arm;
- a rotary arm rotatably attached to a distal end of the arm, the rotary arm having a lower surface with a plurality of grooming members attached to the lower surface; and
- a motor attached to the arm for selectively rotating the rotary arm.

* * * * *